Aug. 11, 1959

H. A. SIMMS 2,898,815

METAL HONEYCOMB EXPANSION

Filed May 6, 1954

INVENTOR.
HAROLD A. SIMMS

BY William R. Lane

ATTORNEY

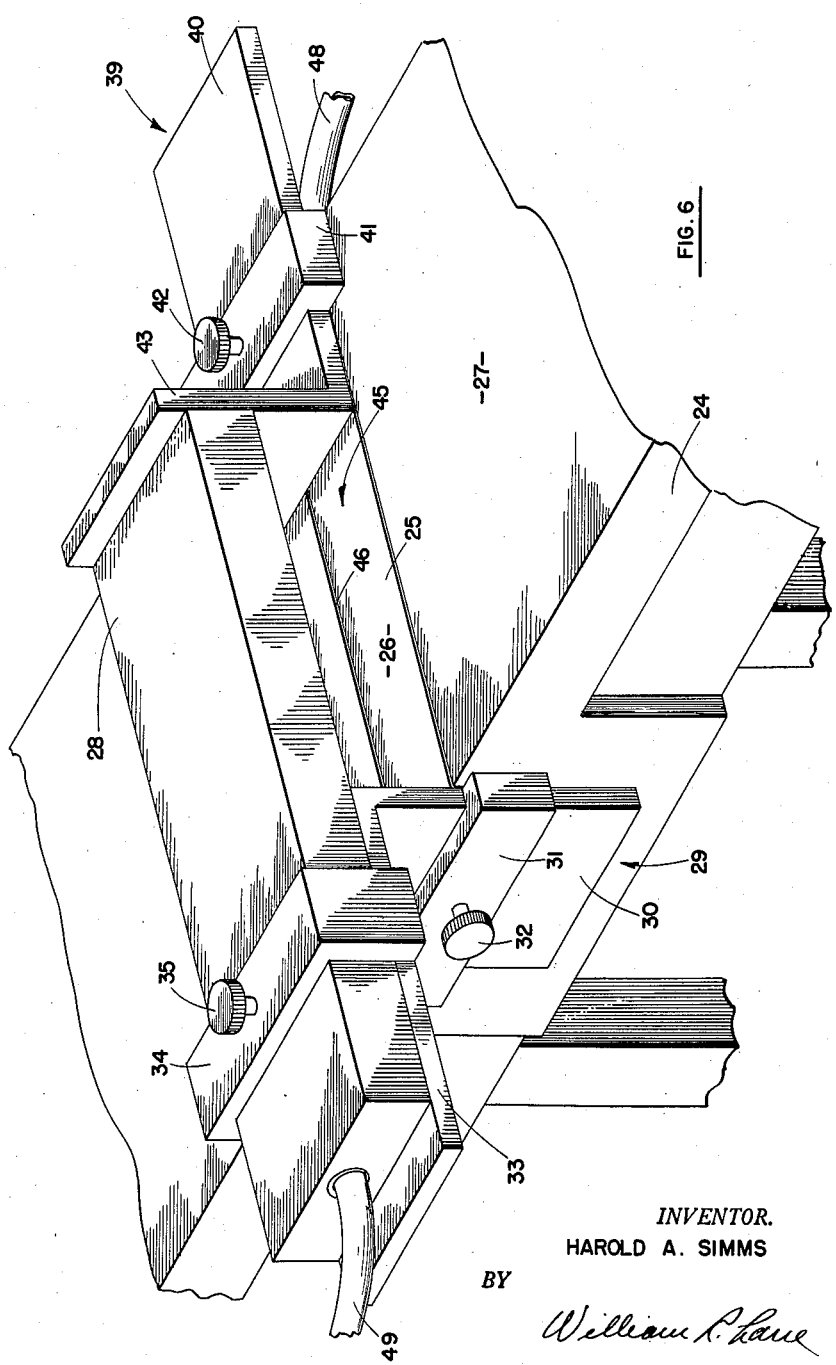

United States Patent Office 2,898,815
Patented Aug. 11, 1959

2,898,815

METAL HONEYCOMB EXPANSION

Harold A. Simms, Redondo Beach, Calif., assignor to North American Aviation, Inc.

Application May 6, 1954, Serial No. 428,060

2 Claims. (Cl. 93—1)

This invention pertains to the expansion of cellular material, and more particularly to the expansion of low-density core material.

Industry has substantially increased its interest in and usage of low-density cellular core material because of its high compressive strength and low weight. Cellular core is customarily employed in sandwich relationship with a pair of externally disposed face sheets bonded thereto to form a sandwich panel which has a high strength to weight ratio. The most common form of cellular core material is comprised of a plurality of very thin metal strips which are bonded together at spaced intervals along their sides. The bonding is so arranged that when the metal strips are expanded, that is, when the metal is bent adjacent the bonds, a honeycomb configuration is defined. In this position the individual cells are extended, and it is of course necessary to so expand the cellular core prior to its use as a low density core. It has been the practice to expand this core by a hand operation. One method is to cement a series of loops to the ends of an unexpanded block of honeycomb core, curing the cement in an oven. The loops are then engaged by fingers. Those at one end of the core are anchored, while those at the other end are attached to a bar which is movable through a suitable mechanism. By pulling on the bar it is then possible to expand the core by bending it adjacent the bonds to define its honeycomb shape. The loops allow for the lateral contraction of the material as the cells are expanded. This method of expansion has several disadvantages. In the first place, it is quite slow, requiring considerable time to bond the loops to the ends of the core material, cure the adhesive and subsequently pull the material to its expanded shape. Furthermore, difficulty is sometimes encountered in expanding the material to precisely its fully extended position without distortion. It is also difficult to avoid damage to the honeycomb core during the expansion operation in this manner.

By the provisions of this invention these shortcomings are avoided and compressed air may be used to effect expansion of such cellular material so that it attains full expansion without waste and with great rapidity.

Therefore, it is an obect of this invention to provide automatic expansion of a material.

Another object of this invention is to provide expansion of a cellular material so that there is no waste or damage to the material upon expansion.

An additional object of this invention is to provide expansion of cellular material in a very short time and in a manner adaptable to mass production.

A still further object of this invention is to provide expansion of cellular material in an economical manner which will reduce labor costs.

Yet another object of this invention is to provide expansion of cellular material by means of compressed air or other fluid.

These and other objects will become apparent from the following detailed description taken in connection with the accompanying drawings in which:

Fig. 6 is a perspective view of a device providing an adjustable opening to receive the cellular material.

Figure 1:
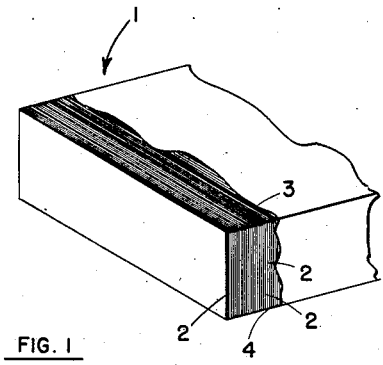
Fig. 1 is a perspective view of cellular material prior to expansion.
Figure 2:
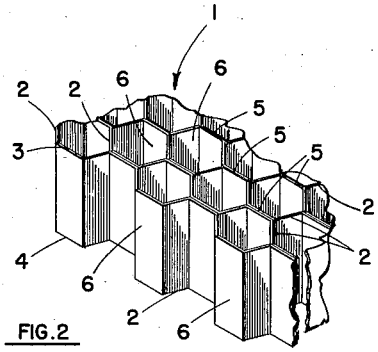
Fig. 2 is a perspective view of the material after expansion.

Referring to the drawings the provisions of this invention are adapted for the expansion of a cellular material which, in its original state, may comprise a plurality of thin metal sheets 2 in the form of a rectangular block as shown in Fig. 1. These sheets are bonded together at predetermined spaced intervals along a line extending normal to the two opposite edges 3 and 4. This bonding is so arranged that when the metal sheets are pulled apart they will bend adjacent the bonds and hexagonal honeycomb cells will be provided. Fig. 2 illustrates a sample of honeycomb material following its expansion and it can be seen that sheets 2 have been bonded together along locations 5 which extend from one edge to the other thereof and that upon expansion the metal is bent adjacent the bonded area. Cells 6 result.

Figure 3:
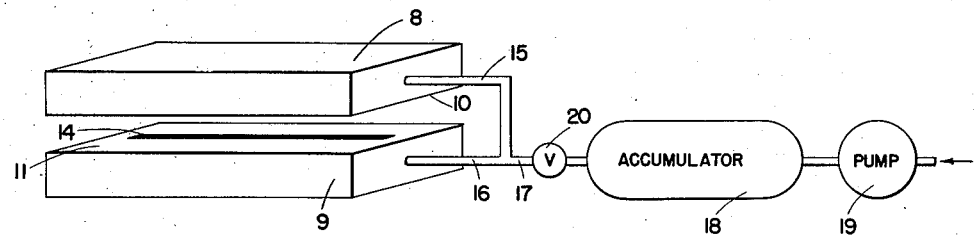
Fig. 3 is a perspective view of two manifolds arranged for effecting expansion of the cellular material.
Figure 4:
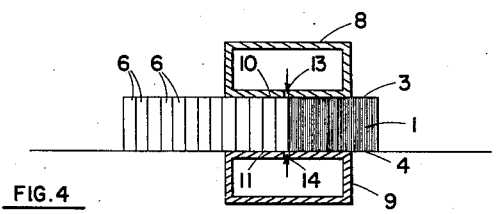
Fig. 4 is a sectional view through the platens of Fig. 3, but with the cellular material disposed between the platens.

Referring now to Figs. 3 and 4, the invention in its simplest form is illustrated. As shown in these figures there are provided two fluid discharge means comprising platens or manifolds 8 and 9 each of which has a hollow interior portion. These platens are disposed opposite each other with their adjacent surfaces 10 and 11 parallel and spaced sufficiently to receive the unexpanded honeycomb element therebetween. Surfaces 10 and 11 are provided with elongated discharge slots 13 and 14 therein which communicate with the hollow interiors of the platens. Also connecting with the hollow interiors of the platens are air inlet lines 15 and 16 which unite at 17 and extend to an accumulator 18. Air compressor supplies the accumulator while valve 20 controls the flow of air through the air lines. Thus it can be seen that by opening valve 20 air under pressure may be supplied to the interiors of the platens and discharged therefrom through the elongated slots 13 and 14.

According to the provisions of this invention the unexpanded core material is fed between the two oppositely disposed platens in the manner illustrated in Fig. 4 while the air streams are discharging. The material should be directly between the platens in such a manner that the individual sheet elements 2 making up the core material are in alignment with the elongated slots. The air discharging from slots 13 and 14 impinges upon opposite edges 3 and 4 of the cellular material and is forced in between the individual metal sheets. The pressurized air then immediately bends the sheets 2 adjacent to the bonded portions 5 and fully extends the material to form the individual cells 6. It is a simple matter, therefore, merely to feed the unexpanded core material between the two platens while the oppositely disposed, aligned airstreams are directed against the opposite edges of the core material. As the unexpanded material is fed in one side the expanded material comes out the other side. In this manner, in a matter of moments, an entire block of cellular material may be expanded without waste or damage to the material.

The exact amount of air pressure used and the width of the discharge slots will vary with the materials employed. Preferably the elongated slot is relatively narrow and for light gauge aluminum material satisfactory operation will be obtained when this slot is in the neighborhood of 0.062 inch wide. More specifically, and as clearly shown in Figure 3, the slot width is less than the width of the cells defining the honeycomb cellular core material. It will thus be seen that all transversely adjacent cells are expanded at the same time, while longitudinally adjacent cells are separately expanded. Air pressure of 100 p.s.i. has been effectual in expanding the core material. It is, of course, necessary that the slots in the platens be long enough to extend the full width of the block of unexpanded core material so that each of the cells will be contacted by the opposing streams of air and fully extended thereby. There should be little clearance between the platens and the cellular material so that the air streams will not be dissipated.

Figure 5:
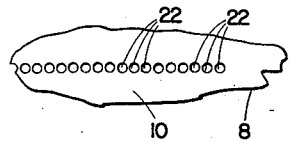
Fig. 5 is a fragmentary plan view of an alternative air discharge arrangement.

If desired, the air outlet from the manifolds may be modified along the lines illustrated in Fig. 5. The continuous discharge slot is omitted in this embodiment and replaced by a series of adjacent openings 22. The principle of operation remains the same and all the cells will be contacted by the air from apertures 22 and extended to the honeycomb configuration.

Figure 7:
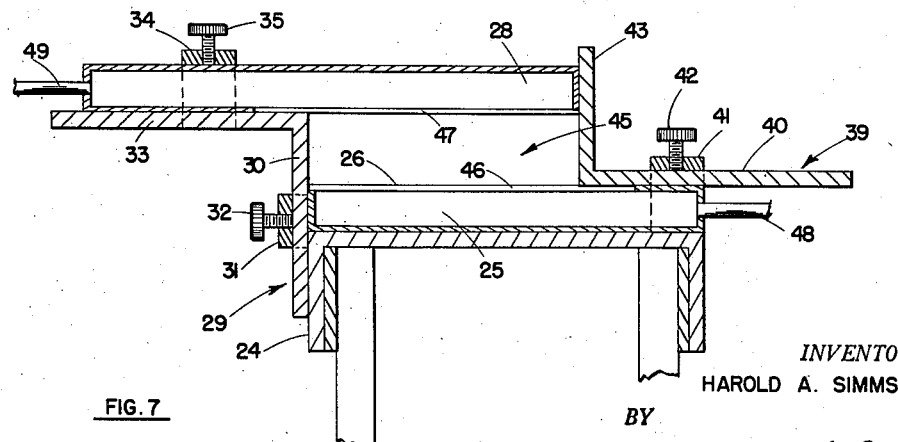
Fig. 7 is a sectional view of Fig. 6.

As shown in Figs. 6 and 7, the platens may be arranged in a suitable machine so that various sizes of core material may be accommodated. Included with this device is a base 24 which acts as a support for the platens and the other elements. A lower platen 25 rests on the base 24 and is preferably secured thereto, within a recessed area so that upper surface 26 of the platen is flush with upper surface 27 of table 24. Upper platen 28 is adjustably carried by the base over the lower platen through movable member 29. The latter member includes a vertical portion 30, located at one end of platen 25, which extends through a U-shaped bracket 31 welded at its extremities to the base. Screw 32 is threadably received in bracket 31 and when tightened will lock member 29 in any desired vertical position. Platen 28 rests upon the horizontal portion 33 of member 29 and is received within U-shaped bracket 34 welded to the horizontal portion of member 29. The platen is slidable along the upper surface of member 33 through the space defined by bracket 34 and may be locked in a desired lateral position by means of screw 35 which threadably extends through bracket 34.

A second movable member 39 is located at the opposite end of platen 27 and includes a horizontal portion 40 slidable on the upper surface of this platen. This portion of member 39 is received within U-shaped bracket 41 and may be locked in a desired lateral position by means of screw 42 threadably received in the bracket. Member 39 includes a vertical portion 43 which is adapted to abuttingly engage the outer end of platen 28.

It can be seen thus far that platens 25 and 28, together with vertical portions 30 and 43 of the movable members, act as walls which define a rectangular opening 45 that can be adjusted in size. Movement of member 29 vertically will increase the vertical dimension of the opening while lateral movement of member 39 and platen 28 will change the width of the opening.

Platen 25 is provided with an elongated air discharge slot 46 which extends from the end of the platen adjacent member 29, and perpendicular to portions 30 and 43 of the movable members. Likewise platen 28 has a similar slot 47. These slots correspond to slots 13 and 14 of the previously described air discharge manifolds. Platens 25 and 28 are also provided with air inlet means 48 and 49, respectively, which are connected to a suitable source of compressed air (not shown). It should be observed that when an adjustment is made of the lateral dimension of opening 45 defined by the movable members and the platens, more or less of the length of slots 46 and 47 will be uncovered. Normally a portion of each of these discharge slots will be beneath a movable member. Thus, as shown in Fig. 7 member 39 extends partially over the top of slot 44 in the right-hand portion thereof. Similarly horizontal portion 33 of member 29 covers a portion of the left-hand part of slot 46. This means that these portions of the discharge slots are blocked off and the discharge will be obtained only where the rectangular opening is defined. In other words, not only is the opening for the reception of the honeycomb material variable in size and shape but the lengths of the air discharge slots are also variable and will discharge only where the rectangular opening occurs. Tightening of screws 35 and 42 will serve to lock the movable members relative to the platens sufficiently to block off any appreciable air discharge from the portions of the slot which they cover. If desired, additional sealing means may be interposed between the movable members and the platens to effect a more perfect seal.

It can be seen that this device is readily adjustable to accommodate honeycomb core material of various thicknesses and various widths. The opening for the reception of this material is readily altered to fit the particular material which is to be expanded. It is a simple matter then to feed the material through the rectangular opening so that the oppositely disposed air discharge slots 46 and 47 will effect expansion of the cellular material, and a large specimen may be expanded in a very short time.

By simple modification the platens or the end members 30 and 43 may be suitably inclined to give opening 45 a shape other than rectangular if the shape of the cellular material warrants it. It is even possible to impart a contour to the surfaces of the platens for use with material which has been shaped prior to its expansion.

The expansion of cellular material in accordance with this invention can be effected with equal facility by fluids other than air, if it is so desired. Not only can various gases be used, but water, oil or other liquid will also expand the cellular material. The latter type of fluid has the advantage of permitting high pressures for expanding heavier material.

It is apparent from the foregoing description that I have provided a method and means for quickly and easily effecting expansion of a cellular material. This expansion of the cellular material is sure in its action and there is no damage to the material expanded, which is always given its fully extended contour. No costly equipment is necessary for carrying out this invention and expansion of the material is effected without requiring a skilled machine operator. Shop air will generally suffice for effecting the expansion and this is normally readily available in an industrial plant.

The foregoing detailed description is to be clearly understood as given by way of illustration and example only, the spirit and scope of this invention being limited only by the appended claims.

I claim:
1. A device for effecting expansion of unexpanded cellular material comprising two fluid discharge means, said fluid discharge means having oppositely disposed surfaces each having an elongated fluid outlet slot therein extending from one end thereof, said slots being of a width less than the width of the expanded cells of said cellular material and being oppositely disposed and in alignment; a source of pressurized fluid connected with said fluid discharge means for providing opposed aligned streams of fluid from said slots adapted to engage edge portions of cellular material received between said surfaces; oppositely disposed end members cooperating with said surfaces to define an opening, said end members and said fluid discharge means being adjustably interconnected whereby the dimensions of said opening is controllable, said end members having portions covering any portions of said discharge slots disposed outside of said opening whereby all fluid discharged from said slots is directed within said opening.

2. A device for expanding unexpanded cellular material comprising a fixed lower platen member having an elongated slot in the upper surface thereof, and a hollow interior portion communicating therewith; a horizontally movable member at one end of said lower platen and adapted to cover portions of said slot, said horizontally movably member including a vertical portion; a vertically movable member at the other end of said platen, said vertically movable member having a vertical portion adjacent said lower platen, and a horizontal portion above said lower platen; an upper platen member engaging said horizontal portion of said vertically movable member and movable through a fixed horizontal path defined thereby, said upper platen member having an elongated slot in the lower surface thereof in alignment with said slot in said lower platen, and a hollow interior portion communicating therewith; each said slot being of a width less than the width of the expanded cells of said cellular material, said upper portion of said vertically movable member being adapted to cover portions of said slot in said upper platen, the outer end of said upper platen member being adapted to engage said vertical portion of said horizontally movable member whereby said vertical portions of said movable members and said platen members cooperate to define an adjustable rectangular opening adapted to receive an unexpanded cellular material therein for expansion thereof by fluid discharged from said elongated slots.

References Cited in the file of this patent
UNITED STATES PATENTS

| | | |
|---|---|---|
| 2,058,005 | Donnellan | Oct. 20, 1936 |
| 2,212,481 | Sendzimir | Aug. 20, 1940 |
| 2,484,641 | O'Hara | Oct. 11, 1949 |
| 2,539,966 | Orovig | Jan. 30, 1951 |
| 2,541,607 | Piazze | Feb. 13, 1951 |
| 2,613,640 | Zallea | Mar. 17, 1953 |
| 2,734,473 | Reynolds | Feb. 14, 1956 |
| 2,740,188 | Simmons | Apr. 3, 1956 |
| 2,790,207 | Steele et al. | Apr. 30, 1957 |